May 2, 1933.  V. BENDIX  1,906,733
BRAKE
Original Filed July 14, 1924   8 Sheets-Sheet 1

Witness
Martin H. Olsen

Inventor
Vincent Bendix
By Cromwell, Greist & Warden
Attys.

May 2, 1933.  V. BENDIX  1,906,733
BRAKE
Original Filed July 14, 1924   8 Sheets-Sheet 2

Inventor
Vincent Bendix
By Cromwell, Greist & Warden
Attys.

Witness
Martin H. Olsen.

May 2, 1933. V. BENDIX 1,906,733
BRAKE
Original Filed July 14, 1924 8 Sheets-Sheet 4

Inventor
Vincent Bendix

May 2, 1933.   V. BENDIX   1,906,733
BRAKE
Original Filed July 14, 1924   8 Sheets-Sheet 7

Witness
Martin H. Olsen.

Inventor
Vincent Bendix
By Cromwell, Greist & Warden
Attys.

May 2, 1933.   V. BENDIX   1,906,733
BRAKE
Original Filed July 14, 1924   8 Sheets-Sheet 8

Witness
Martin H. Olsen.

Inventor
Vincent Bendix

Patented May 2, 1933

1,906,733

UNITED STATES PATENT OFFICE

VINCENT BENDIX, OF CHICAGO, ILLINOIS, ASSIGNOR TO BENDIX BRAKE COMPANY, OF CHICAGO, ILLINOIS, A CORPORATION OF ILLINOIS

BRAKE

Application filed July 14, 1924, Serial No. 726,050. Renewed July 23, 1932.

The invention has to do with brakes such as are particularly adaptable to road vehicles for the purpose of braking the movement of the wheels or other rotatable parts.

The brakes heretofore proposed for such adaptation have consisted, in most instances, of a cylindrical drum mounted for rotation with the wheel, and one or more braking elements mounted for movement radially of the wheel into frictional engagement with the It will be understood that such embodiments are chosen primarily for the purpose of exemplification, and are not intended to restrict the spirit of the invention short of its scope as defined by the appended claims.

Reference will first be made to that form of the invention illustrated in Figs. 1 to 8 inclusive, wherein the brake is presented in association with a conventional front wheel assembly consisting of an axle 10, a spindle 11 pivoted on the axle, and a wheel 12 journaled on the spindle.

Figures 1, 5, 6:
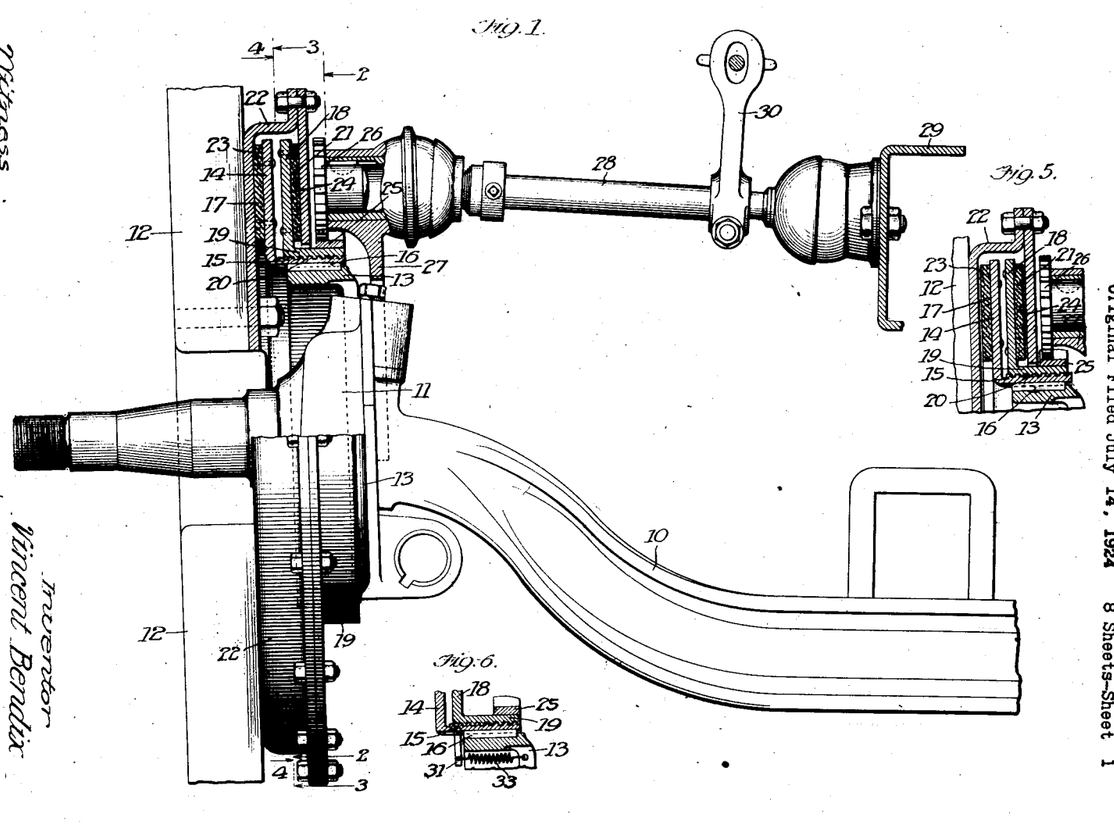
Fig. 1 is a partially sectioned side elevation of one form of the invention.
Figure 2:
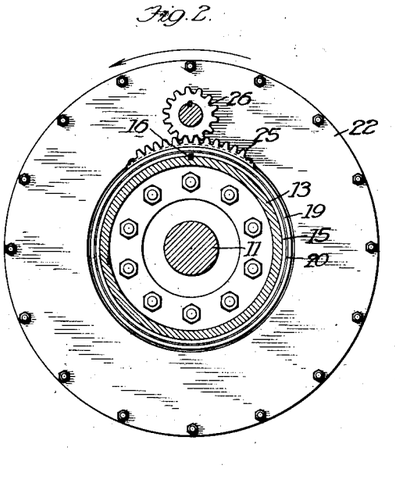
Figs. 2, 3 and 4 are vertical sections taken on the lines 2—2, 3—3 and 4—4 respectively other form of the invention, as applied to the transmission of a vehicle.
Figure 3:
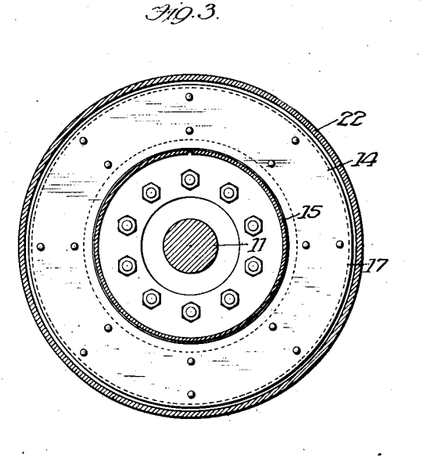
Figure 4:
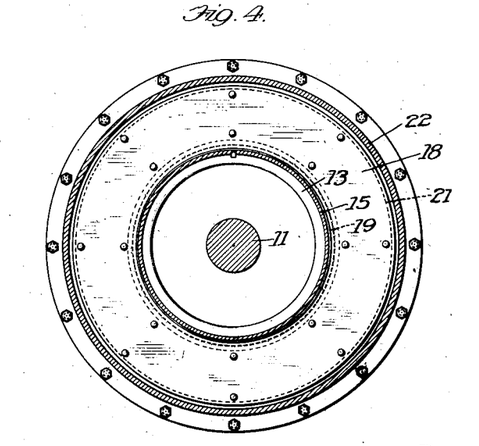
Figure 7:
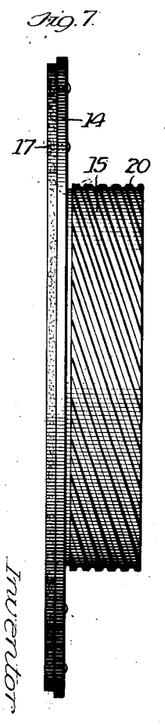

The brake includes a cylindrical mounting bracket 13 which is carried by the spindle 11, an annular disk 14 having an inner peripheral flange 15 which is sleeved over the bracket 13 and is splined thereto by a suitable key 16 for movement on the bracket axially of the assembly, an annular friction mat 17 secured to the front face of the disk 14, an annular disk 18 having an inner peripheral flange 19 which is sleeved over the flange 15 and is engaged therewith by interfitting spiral threads 20 of rather abrupt pitch arranged to permit separative movement of the disk 18 spirally of the disk 14 in the general direction of rotation of the wheel 12, an annular friction mat 21 secured to the rear face of the disk 18, a casing 22 which is carried by the wheel 12 and encompasses the disks 14 and 18, an annular friction surface 23 on the front disk-like wall of the casing 22 for coaction with the opposed friction mat 17 on the disk 14, another annular friction surface 24 on the rear disk-like wall of the casing 22 for coaction with the opposed friction mat 21 on the disk 18, and operating means for effecting separative movement of the disks 14 and 18 into frictional engagement with the spaced disk-like walls of the casing. The operating means mentioned include a short arcuate rack 25 which is secured to the outer periphery of the flange 19 exteriorly of the casing 22, a pinion 26 which is meshed with the rack 25 and is journaled in a support 27 carried by either the spindle 11 or the bracket 13, a universally mounted rod 28 which is supported at one end on the chassis 29 for operating the pinion 26, and a short arm 30 which is secured to the rod 28 for oscillating the same from a suitable brake lever in the vehicle to turn the pinion and thereby effect the desired relative movement of the disks 14 and 18 axially of the assembly. For convenience in assembling or disassembling the brake, the casing 22 may be formed in two axially separable parts.

When the brake is applied, the disks 14 and 18 will move into frictional engagement with the disk-like walls of the rotating casing 22 through the intermediation of the friction mats 17 and 21; the disk 14 moving axially of the assembly, and the disk 18 moving spirally of the axis of the assembly in the general direction of rotation of the casing 22. When the friction mat 21 on the disk 18 initially contacts with the friction surface 24 on the rear disk-like wall of the casing, the frictional engagement set up by such contact will tend to continue the spiral movement of the disk 18, and will accordingly tend to effect completely the requisite frictional engagement of both of the friction mats 17 and 21 with both of the friction surfaces 23 and 24, respectively, through an obvious self-energizing action. The stresses acting on the disks axially of the assembly to effect and maintain the frictional engagement are equal in opposite directions, and are neutralized within the assembly by the floating characteristic of the mounting of the disks, which characteristic also insures a uniform distribution of the braking stresses throughout all of the several friction surfaces of the brake.

When the brake is not in operation, the disks 14 and 18 are so spaced apart as not to be in frictional engagement with the disk-like walls of the rotating casing 22, but, if it is desired to prevent the disks as a unit from floating in either direction axially of the assembly into contact with the walls of the casing, centering means such as illustrated in Fig. 6 may be employed. The centering means include a stud 31 which extends inwardly from the flange 15 of the disk 14 closely adjacent the front edge 32 of the bracket 13, and a spring 33 which extends axially of the assembly between the stud 31 and a suitable attaching portion of the bracket 13. The stud and spring arrangement is preferably duplicated at a diametrically opposite portion of the brake. When the brake is applied, the studs 31 will move away from the edge 32 of the bracket, and, when the brake is not in operation, the springs 33 will cause the studs 31 to move into contact with the edge 32 of the bracket, thereby acting to maintain the disks 14 and 18 in spaced relation to the walls of the casing.

Reference will now be made to that form of the invention illustrated in Figs. 9 and 10.

The differences distinguishing this form of the invention from the first form reside in the interior construction of the casing 22, in the location of the friction mats 17 and 21 relative to the disks 14 and 18, and in the direction in which the threads 20 between the flanges 15 and 19 are spiralled. The casing is provided with an annular disk-like web 34 intermediate its front and rear walls, and this web, instead of the front and rear walls, presents on its opposite faces the two friction surfaces 23 and 24 of the casing. This arrangement of course necessitates corresponding changes in the location of the friction mats 17 and 21 relative to the disks 14 and 18, and in the movement of the disks 14 and 18 from a separative movement axially of the assembly to a convergent one requiring a reversal in the direction of the threads 20 and the flanges 15 and 19. In this form of the invention the friction mats 17 and 21 are not secured to the disks 14 and 18, but float freely alongside the same when the brake is not in operation. This arrangement of the mats, which is equally applicable to any of the forms of the invention, permits both faces of the friction mats to be used to advantage in effecting the frictional engagement between the disks 14 and 18 and the web 34.

Figures 8, 9, 10, 11, 12:
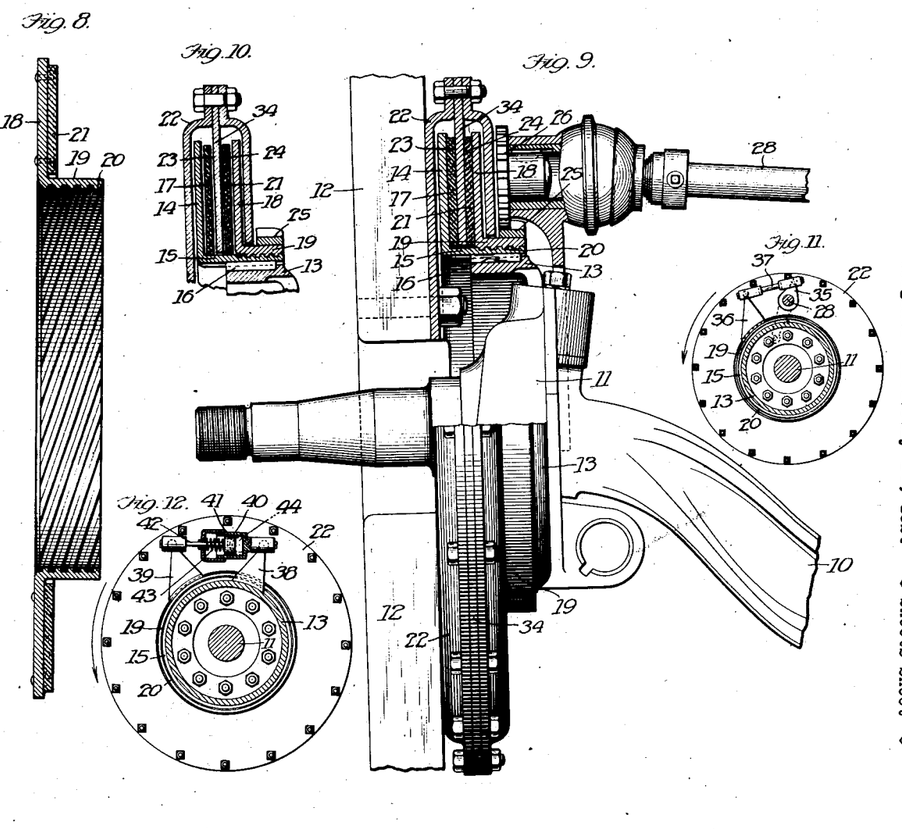

In Fig. 11 is illustrated a form of operating means which may be used with any of the forms of the invention in lieu of the pinion and rack arrangement. This form of operating means includes a torque arm 35 connected with the operating rod 28, another torque arm 36 secured to the flange 19 of the disk exteriorly of the casing 22, and a coupling link 37 universally connected with the arms 35 and 36. When the rod 28 is oscillated to apply the brake, the operating means described will turn the flange 19 on the flange 15 and will give the same result as if the pinion and rack arrangement were used for that purpose.

In Fig. 12 is illustrated another form of operating means which includes a fixed support 38 extending from the bracket 13, a torque arm 39 secured to the flange 19 of the disk 18 exteriorly of the casing 22, a small fluid cylinder 40 universally coupled at one end to the support 38, a piston 41 connected to the torque arm 39, a spring 43 tending to move the piston 41 into the cylinder 40, and a conduit 44 for feeding fluid under pressure to the cylinder 40. When the fluid is fed to the cylinder 40, the piston 41 will be moved outwardly and will cause the flange 19 to turn on the flange 15.

Reference will now be made to that form of the invention illustrated in Figs. 13 to 17 inclusive.

The differences distinguishing this form of the invention from the first form described reside in the omission of the threads 20 between the flanges 15 and 19 of the disks 14 and 18, and in the employment, instead, of a plurality of axially inclined cams 45 in operative association with the disks 14 and 18. The cams 45, which may be located upon the faces of the disks 14 and 18 opposite the friction mats 17 and 21 or upon any other suitable portions of the disks, transmit to the disks substantially the same axial and spiral movements respectively when the flange 19 of the disk 18 is turned as would the threads 20. If simple wedge cams 45 such as illustrated are used, the disks 14 and 18 will not be drawn together again when the flange 19 is turned in the reverse direction. In order to draw the disks together again, leaf springs 46, such as illustrated in Fig. 14 may be secured in such a way to the rear edge of the flange 15 of the disk 14 as to yieldingly bear against the rear edge of the flange 19 of the disk 18.

Figures 13, 14, 15, 16, 17, 18:
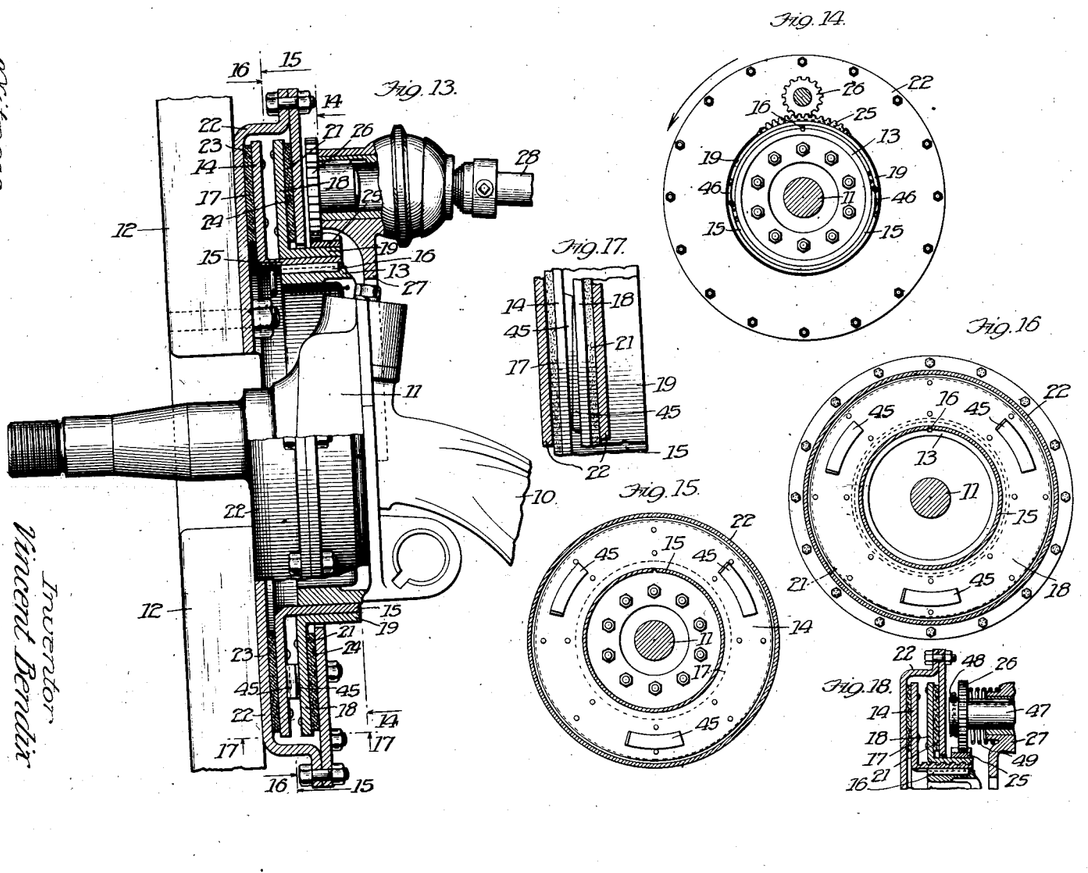

Adjustment may be made in the brake to compensate for wear in the parts by the employment of a mounting for the pinion 26, such as that illustrated in Fig. 18, wherein the pinion 26 is splined on a spindle 47 for axial movement thereon and is held normally against an enlarged end 48 of the spindle in meshed relation to the rack 25 by means of a spring 49 which will permit the pinion to be temporarily shifted axially of the spindle 47 a sufficient distance to disengage from the rack, whereupon the pinion may be turned a distance of one or two teeth, as it may be found necessary to effect the adjustment desired, and then returned to its normal position in meshed engagement with the rack.

Figures 19, 20:
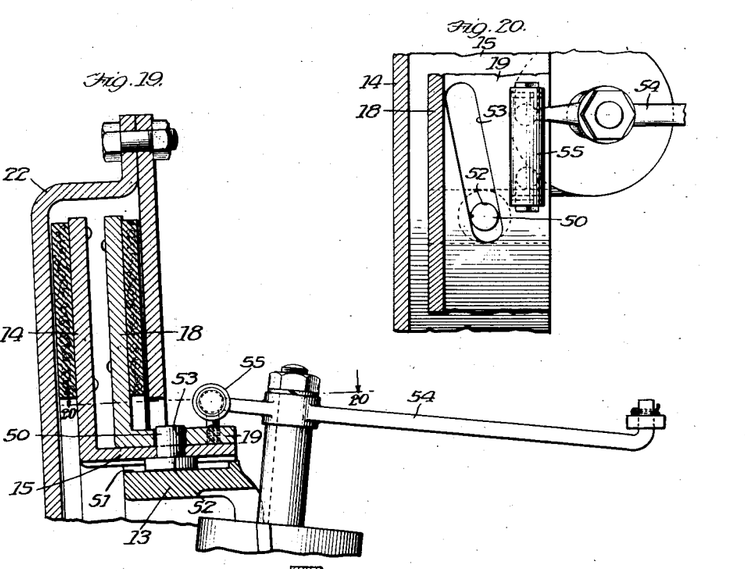

Reference will now be made to that form of the invention illustrated in Figs. 19 and 20.

In this form of the invention, the camming connection between the disks 14 and 18 is effected with a single pin 50 having a head movable axially of the assembly in a keyway 51 of the bracket 13 and a shank extending radially through both a round aperture 52 in the flange 15 of the disk 14 and an elongated oblique slot 53 in the flange 19 of the disk 18. The pin 50 permits the disks 14 and 18 to move freely as a unit axially of the assembly, and causes the disk 18 to move spirally of the disk 14 when rotary movement is transmitted to the flange 19 of the disk 18. The flange 19 may be moved by any of the operating means heretofore described, or by an intermediately pivoted lever 54 which connects at one of its free ends with the flange 19 by means of a universally mounted coupling link 55.

Figure 21:
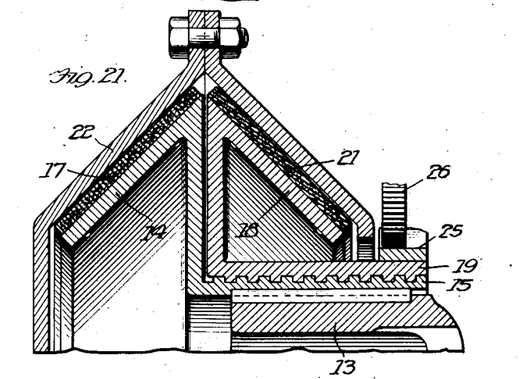

Reference will now be made to that form of the invention illustrated in Fig. 21.

In this form of the invention the disks 14 and 18 are of conical shape, and the front and rear walls of the casing 22 are of a similar shape to interfit therewith. The manner in which the disks are moved into operation, and the means for rotating the flange 19 of the disk 18 are substantially the same as in the first form described.

Figure 22:
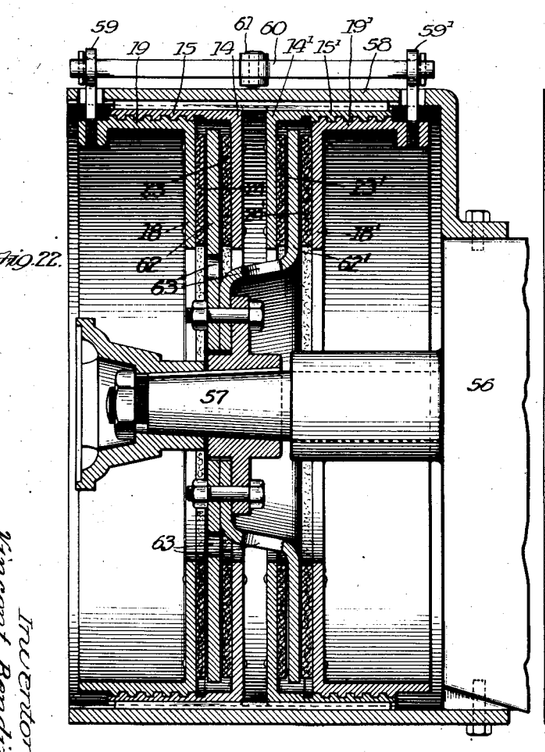
Figure 23:
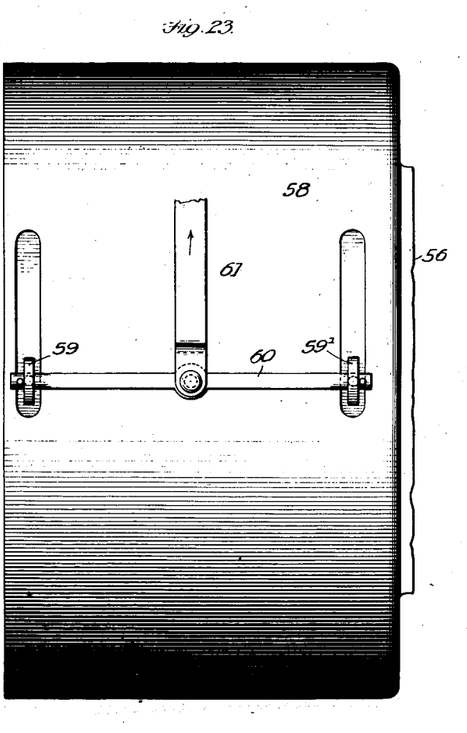
Fig. 23 is a top view.

Reference will now be had to that form of the invention illustrated in Figs. 22 and 23, wherein the brake is presented in association with a conventional transmission assembly consisting of a transmission casing 56 and a power transmitting shaft 57.

In this form of the invention the transmission casing 56 may carry a drum 58 which is the equivalent of the bracket 13 previously described in the other forms, and has keyed thereto the flanges 15 15' of the disks 14 14'. It will be noted in this form of the invention that a double unit brake is employed, although it will be obvious that any of the single brake units herein described may be used for the same purpose. The flanges 19 19' of the disks 18 18' are threaded on the flanges 15 15', and are rotated simultaneously to operate the brake by means of projections 59 59' on the flange 19 19', which flanges may project through elongated apertures in the drum 58. In order to equalize the operation of the two brake units, a cross link 60 is connected with the projections 59 59', and is in turn connected at its center with an equalizing pull rod 61. The power transmitting shaft 57 of the transmission is provided with two spaced disks 62 and 62'. The disks 62 and 62', which are the equivalent of the casing 22 in the previously described form, present on their opposite faces the friction surfaces 23 and 24 and 23' and 24'. By spacing the disks 62 and 62' away from each other in the manner shown, and by aperturing the disks as at 63, the heat produced in the operation of the brake will be rapidly dissipated.

It will be appreciated that every one of the forms of the invention is applicable to a transmission, and that the brake may be constructed on a small diameter to accommodate itself to the limited space available for the same at the rear end of the transmission below the floor boards.

Reference will now be made briefly to those forms of the invention illustrated in Figs. 24 to 32 inclusive.

In those form illustrated in Figs. 24 to 29 inclusive the friction surfaces 23 and 24 presented by the casing 22 are not formed on the side walls or a web of the casing, but are formed upon one disk 64 or two integrally associated disks 65 and 66 which are freely movable axially of the assembly upon suitable pins 67 or keys 68 carried by the casing 22.

Figure 24:
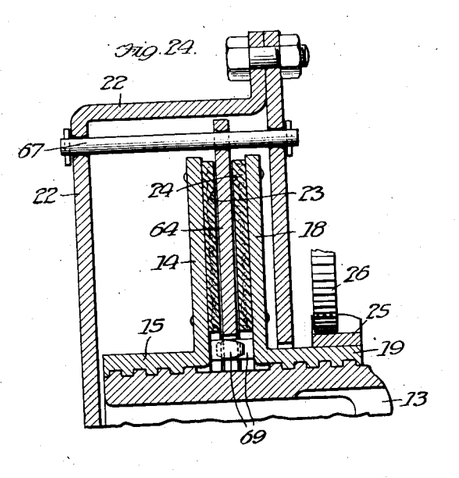
Figs. 24, 25, 26, 27, 28, 29 and 30 are fragmentary sectional views through several other forms of the invention.

In Fig. 24 the disks 14 and 18 do not float as a unit axially of the assembly, as the disk 64 obviously will effect the desired neutralization of axial thrust, and are both screw-threaded to the bracket 13. The flange 19 of the disk 18 is moved by the pinion and rack arrangement previously described, and such movement is transmitted to the flange 15 of the disk 14 by means of interlocked but axially slidable fingers 69 carried by the flanges of the disks.

Figure 25:
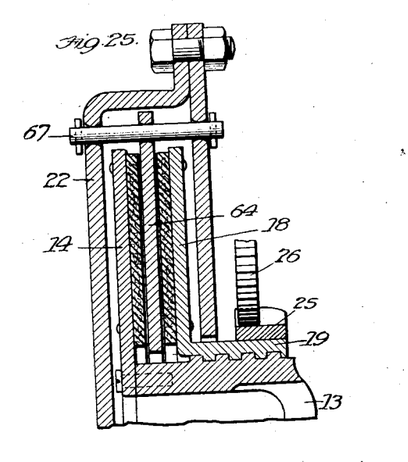

In Fig. 25 the disk 14 is fixedly associated with the bracket 13, and the flange 19 of the disk 18 is in threaded connection with the bracket 13.

Figure 26:
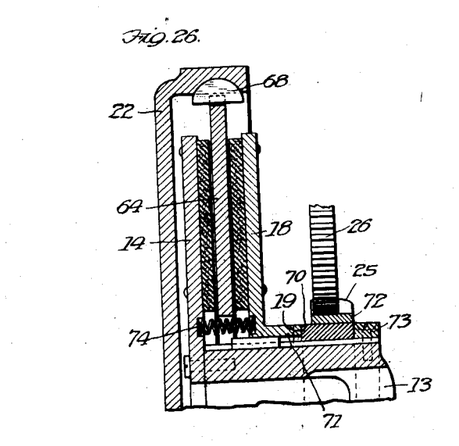

In Fig. 26 axial movement only of the braking elements is had. The disk 14 is fixedly associated with the bracket 13, and the flange 19 of the disk 18 is keyed to the bracket 13 for movement axially of the assembly. The edge 70 of the flange 19 is in the form of a cam which contacts with the corresponding cam-like edge 71 of a ring 72 on which the operating rack is mounted. When the rack 25 turns the ring 72, the cam surfaces 70 and 71 of the flange 19 and ring 72 will force the flange 19 with the disk 18 axially of the assembly, the ring 72 bearing axially in the opposite direction against a retaining ring 73 positioned about the rear edge of the bracket 13. A spring 74 may be interposed between the disks 14 and 18 to return the disk 18 to its normal position when the brake is not in operation.

Figure 27:
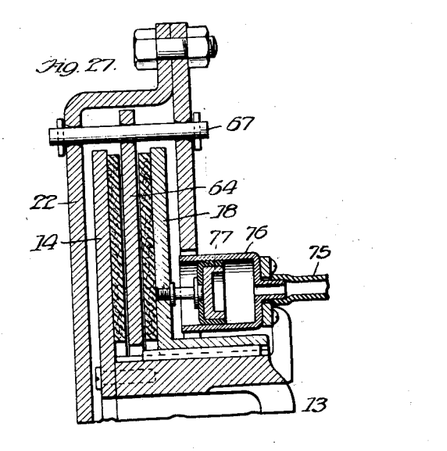

In Fig. 27 the mounting of the disks 14 and 18 is somewhat similar to that illustrated in Fig. 26, in that the disk 14 is substantially associated with the bracket 13 and the disk 18 is movable only axially of the assembly. The means for moving the disks 18 are fluid-operated, and include a conduit 75, a cylinder 76 mounted on the bracket 13, and a piston 77 connected with the disk 18. When the brake is released, the disk 18 may be returned to its normal position by suction of the fluid upon the piston 77.

Figures 28, 30:
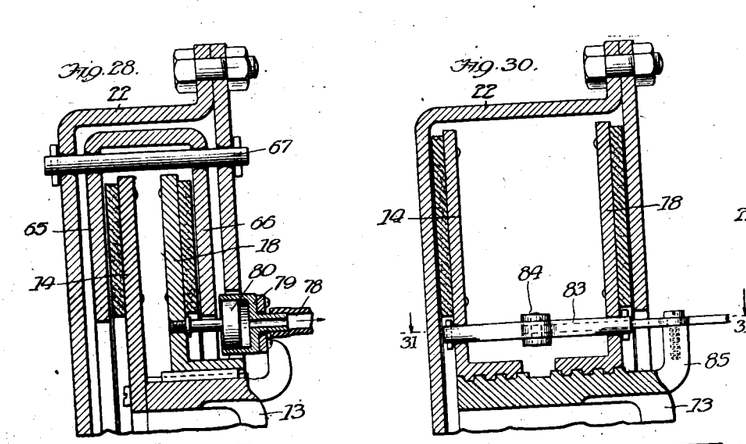

In Fig. 28, wherein the floating disks 65 and 66 are employed, the disk 14 is fixedly associated with the bracket 13 and the disk 18 has only axial movement, the disk being moved by vacuum-operated means consisting of a conduit 78, a vacuum chamber 79 mounted on the bracket 13 and a piston 80 in the chamber connected with the disk 18.

Figure 29:
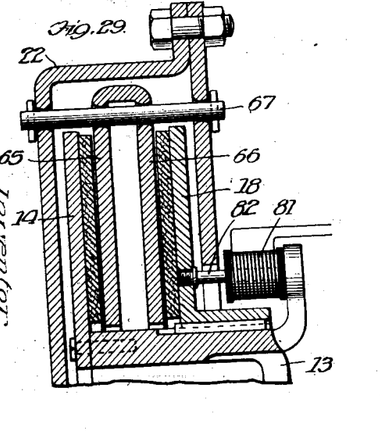

In Fig. 29 a disk 18 is moved axially of the assembly by an electric mechanism consisting of a solenoid 81 mounted on the bracket 13 and a core 82 in the solenoid connected with the disk 18.

Figure 31:
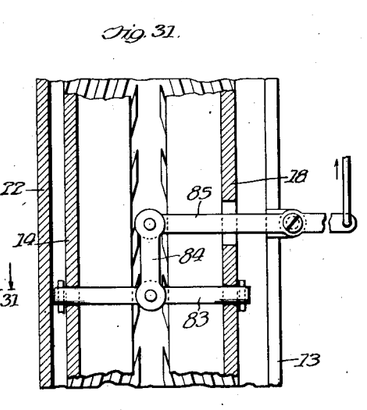
Fig. 31 is a section taken on the line 31—31 of Fig. 30.

In Figs. 30 and 31 the disks 14 and 18 are both moved spirally in opposite directions axially of the assembly on the bracket 13, and the means for operating the disks consists of a cross link 83 which is loosely connected at its ends with the disks 14 and 18 and is loosely connected intermediate its ends by a short draw link 84 which is in turn connected to one end of an intermediately pivoted lever 85 carried by the bracket 13. It will be evident that if one of the disks tightens up before the other, the link arrangement provided will serve to equalize the application of both disks.

Figure 32:
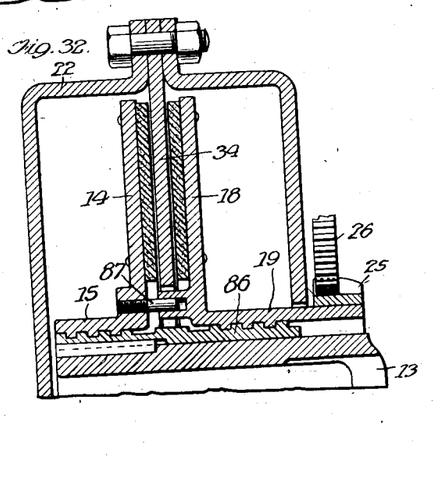
Fig. 32 is a fragmentary sectional view through another form of the invention.

In Fig. 32 the disks 14 and 18 are both moved spirally in opposite directions axially of the assembly but, instead of having screw-threaded connections with the bracket as shown in Fig. 30, the disks 14 and 18 have screw-threaded connections with a sleeve 86 which is freely movable axially of the assembly and serves to neutralize all axial thrust. The flange 19 of the disk 18 is moved by the rack and pinion arrangement previously described, and such movement is translated to the flange 15 of the disk 14 by a loose stud connection 87 between the flanges of the disks.

In each of the several forms of the invention, it will be recognized that a non-rotatable part is present in the bracket 13 of the spindle, or in the drum 58 of the transmission casing, or in any equivalent structure; that a plurality of braking elements associated with such non-rotatable part are present in the friction surfaces of the disks 14 and 18 or of the mats associated with the disks; that a rotatable part is present in the casing 22, or the disks 62 and 62′, or other equivalent structure; and that a plurality of braking elements associated with such rotatable part are present in the friction surfaces of the disk-like walls of the casing 22 or the disks 62 and 62′.

The expression "braking elements" as used in the claims defines essentially the frictional surfaces, and it is immaterial whether the frictional engagement between such surfaces is had by direct contact or by the intermediation of friction mats, either attached or floating. The expression "movable spirally of the axis" defines a combined axial and rotary movement which is not necessarily of uniform progress in either direction but may vary, for instance, as the movement imparted by a curved cam.

The subject matter of Figures 28 and 29 and the description relative thereto form the basis of my divisional application Serial No. 216,096, filed August 29, 1927, while the subject matter of Figures 9, 10, 22, 23 and 32; and 13–18, 19, 20 and 26 and the description relative thereto form the basis of my divisional applications 652,961 and 652,962, respectively, filed January 21, 1933.

The above application #216,096 is directed to the subject matter of application #658,205 filed February 23, 1933, which latter is a re-file of the former.

I claim:

1. A brake, including a non-rotatable part, a rotatable part, a plurality of braking elements associated respectively with the parts, the elements associated with the non-rotatable part having inter-engaging central flanges and means operating on said flanges for effecting movement of certain of the braking elements axially of the assembly into frictional engagement with other of the braking elements to brake the rotatable part.

2. A brake, including a non-rotatable part, a rotatable part, a plurality of annular braking elements associated respectively with the parts, and means acting adjacent the inner edges of said elements for effecting movement of certain of the braking elements apart in opposite directions axially of the assembly into frictional engagement with other of the braking elements to brake the rotatable part.

3. A brake, including a non-rotatable part, a plurality of braking elements associated therewith, a rotatable part, a plurality of braking elements associated therewith, one of said sets of elements having inter-engaging central flanges and means acting on said flanges for effecting movement of the braking elements of one of the sets apart axially of the assembly into frictional engagement with the braking elements of the other of the set to brake the rotatable part.

4. A brake, including a non-rotatable part, a plurality of braking elements associated therewith, a rotatable part, a plurality of braking elements associated therewith, one of said sets of elements having inter-engaging control flanges, and means acting on said flanges for effecting movement of the first mentioned braking elements apart axially of the assembly into frictional engagement with the last mentioned braking elements to brake the rotatable part.

5. A brake, including a non-rotatable part, a braking element associated therewith, a rotatable part, a braking element associated therewith, and means for effecting a limited movement of one of the braking elements spirally of the axis of the assembly in the general direction of rotation of the rotatable part into frictional engagement with the other braking element to brake the rotatable part, the elements being so arranged as to balance the axial thrusts.

6. A brake, including a non-rotatable part, two braking elements associated therewith, a rotatable part, two braking elements associated therewith, and means for effecting movement of the two first mentioned braking elements into frictional engagement with the two second mentioned braking elements to brake the rotatable part; one of the two first mentioned braking elements being movable axially of the assembly and the other being movable spirally of the axis of the assembly.

7. A brake, including a non-rotatable part, two braking elements associated therewith, a rotatable part, two braking elements associated therewith, and means for effecting movement of the two first mentioned braking elements into frictional engagement with the two second mentioned braking elements to brake the rotatable part; the two last mentioned braking elements being fixed axially of the assembly, one of the two first mentioned braking elements being movable axially of the assembly, and the other of the two first mentioned braking elements being movable spirally of the axis of the assembly in the general direction of rotation of the rotatable part.

8. A brake, including two relatively movable braking elements, a positive mechanical connection between the elements serving when the brake is operated to employ the reaction from the axial thrust of either element as the actuation for the axial thrust of the other element, and means for operating the brake.

9. A brake, including a non-rotatable part, a rotatable part, two relatively movable braking elements associated with one of the parts to brake the rotatable part, a positive mechanical connection between the elements serving when the brake is operated to employ the reaction from the axial thrust of either element as the actuation for the axial thrust of the other element, and means for operating the brake.

10. A brake, including a non-rotatable part, a rotatable part, and a plurality of braking elements associated respectively with the parts; certain of the braking elements being movable in opposite directions axially of the assembly into frictional engagement with other of the braking elements, and being positively connected to have parts bearing directly reactively against each other during a portion of such movement whereby to neutralize axial thrust.

11. A brake, including a non-rotatable part, and two braking elements associated therewith, a rotatable part, and two braking elements associated therewith; the two braking elements associated with the non-rotatable part being movable in opposite directions axially of the assembly into frictional engagement with the braking elements associated with the rotatable part, and being positively mechanically connected to bear reactively against each other throughout such movement whereby to neutralize axial thrust.

12. A brake, including a non-rotatable part having in association therewith interengaging parallel friction members movable axially of the assembly, a rotatable part having in association therewith parallel friction members enclosing the first members and adapted to be engaged by the first mentioned members to brake the rotatable part, and means to move the first mentioned members into such engagement.

13. A brake, including a non-rotatable part having in association therewith parallel friction members having interfitting central tubular flanges and movable axially of the assembly, a rotatable part having in association therewith parallel friction members adapted to be engaged by the first mentioned surfaces to brake the rotatable part, and means acting on said flanges to move the first mentioned members away from each other into such engagement.

14. A brake, including a non-rotatable part having in association therewith two parallel friction surfaces one of which is movable axially of the assembly and the other of which is movable spirally of the axis of the assembly, a rotatable part having in association therewith two parallel friction surfaces relatively non-movable axially of the assembly, and means to move the first mentioned surfaces into engagement with the last mentioned surfaces to brake the rotatable part.

15. A brake, including a non-rotatable part having in association therewith two parallel friction surfaces one of which is movable axially of the assembly and the other of which is movable spirally of the axis of the assembly, a rotatable part having in association therewith two parallel friction surfaces relatively non-movable axially of the assembly and means to bring the first and last mentioned surfaces into engagement with each other to brake the rotatable part.

16. A brake, including a non-rotatable part having in association therewith two parallel friction surfaces one of which is movable axially of the assembly and the other of which is movable spirally of the axis of the assembly, a rotatable part having in association therewith two parallel friction surfaces relatively non-movable axially of the assembly, and means to bring the first and last mentioned surfaces into engagement with each other to brake the rotatable part, the first mentioned surfaces being freely movable as a unit axially of the assembly whereby to neutralize axial thrust.

17. A brake, including a non-rotatable part, a disk connected with the non-rotatable part and movable axially of the assembly, another disk connected with the non-rotatable part and movable spirally of the axis of the assembly, a rotatable part, means associated therewith for frictional engagement by the disks, and means for effecting movement of the disks into such frictional engagement to brake the rotatable part.

18. A brake, including a non-rotatable part, a disk connected with the non-rotatable part and movable spirally of the axis of the assembly, a rotatable part, a disk connected with the rotatable part, means for moving the first mentioned disk spirally in the general direction of rotation of the rotatable part and into frictional engagement with the second mentioned disk to brake the rotatable part, and means for balancing the axial thrust of the disks.

19. A brake, including a non-rotatable part, a disk having a splined connection with the non-rotatable part for movement axially thereof, another disk having a camming connection with the first mentioned disk for movement spirally thereof, a rotatable part, means associated with the rotatable part for frictional engagement by the disks, and means for oscillating the second mentioned disk to effect a resulting movement of both disks axially of the assembly into and out of such frictional engagement to brake the rotatable part.

20. A brake, including a non-rotatable bracket adapted to be carried by a wheel spindle, a disk having a splined connection with the bracket for movement axially thereof, another disk having a screw-threaded camming connection with the first mentioned disk for movement spirally thereof, a rotatable casing adapted to be carried by a vehicle wheel and provided with disk-like portions for frictional engagement by the disks, and means for oscillating the second mentioned disk to effect a resulting movement of both disks axially of the assembly into and out of engagement with the disk-like portions of the casing to brake the casing and the wheel, said means including an arcuate rack associated with the last mentioned disk, and a pinion associated with the spindle for oscillating the rack.

21. A brake for a swivelled wheel, including a braking element adapted for frictional engagement with another portion of the brake when the brake is operated, and means for moving the braking element into such engagement including a rack associated with the braking element and a pinion meshed with the rack so arranged that the rack and pinion are not operated by swivelling the wheel.

22. A brake, including a braking element adapted for frictional engagement with another portion of the brake when the brake is operated, a rack connected with the braking element, a pinion meshed with the rack for moving the braking element into such engagement, and a spring for normally maintaining the pinion in mesh with the rack, whereby the pinion may be moved against the action of the spring out of engagement with the rack and then re-meshed with the rack in an adjusted position.

23. A brake for a swivelled wheel, including a non-rotatable part, a rotatable part, a plurality of disk-like portions associated respectively with the parts for frictional engagement with each other to brake the rotatable part, a cam-like connection between the disk-like portions associated with one of the parts for effecting relative movement axially of the assembly between such disk-like portions upon limited rotary movement being imparted to one of such disk-like portions, and means to impart such limited rotary movement without interfering with swivelling the wheel.

24. A brake for a swivelled wheel, including a braking element adapted for frictional engagement with another portion of the brake when the brake is operated, and means for moving the braking element into such engagement including a universally mounted rod movable horizontally in the direction of its length to move one of its ends substantially into the swivelling axis and connected with the braking element.

25. A servo brake comprising a rotatable and a plurality of interconnected axially movable brake members.

26. A servo brake comprising a rotatable disk and a plurality of mechanically connected axially movable brake members.

27. A servo brake mechanism comprising a rotatable member, a plurality of axially movable members, means interconnecting the axially movable members adapted to transmit a force proportionate to the speed of rotation of the rotatable member from one of the axially movable members to another.

28. A brake, including a non-rotatable part, a set of braking elements associated therewith, a rotatable part, a set of braking elements associated therewith for frictional engagement with the first mentioned set of braking elements, one of the sets of braking elements being freely movable as a unit axially of the assembly whereby to neutralize axial thrust, and centering means for maintaining such set in uniformly spaced relation to the other set when the brake is not in operation, including an abutment, a stop engageable therewith for limiting the movement of such set as a unit in one direction axially of the assembly, and a spring tending to hold the stop against the abutment.

29. A brake disc having a central exteriorly-threaded sleeve, and means for securing said disc against rotation.

In testimony whereof I have hereunto signed my name.

VINCENT BENDIX.

CERTIFICATE OF CORRECTION.

Patent No. 1,906,733.  May 2, 1933.

VINCENT BENDIX.

It is hereby certified that error appears in the printed specification of the above numbered patent requiring correction as follows: Page 4, line 37, for "form" read "forms"; page 5, line 73, claim 3, for "set" read "sets"; and line 79, claim 4, for "control" read "central"; and that the said Letters Patent should be read with these corrections therein that the same may conform to the record of the case in the Patent Office.

Signed and sealed this 22nd day of August, A. D. 1933.

M. J. Moore.
Acting Commissioner of Patents.

(Seal)